Aug. 4, 1959 R. ROSEBROOK 2,897,788
SERVO CONTROL FOR RACK MECHANISM
Filed Feb. 25, 1957 3 Sheets-Sheet 1
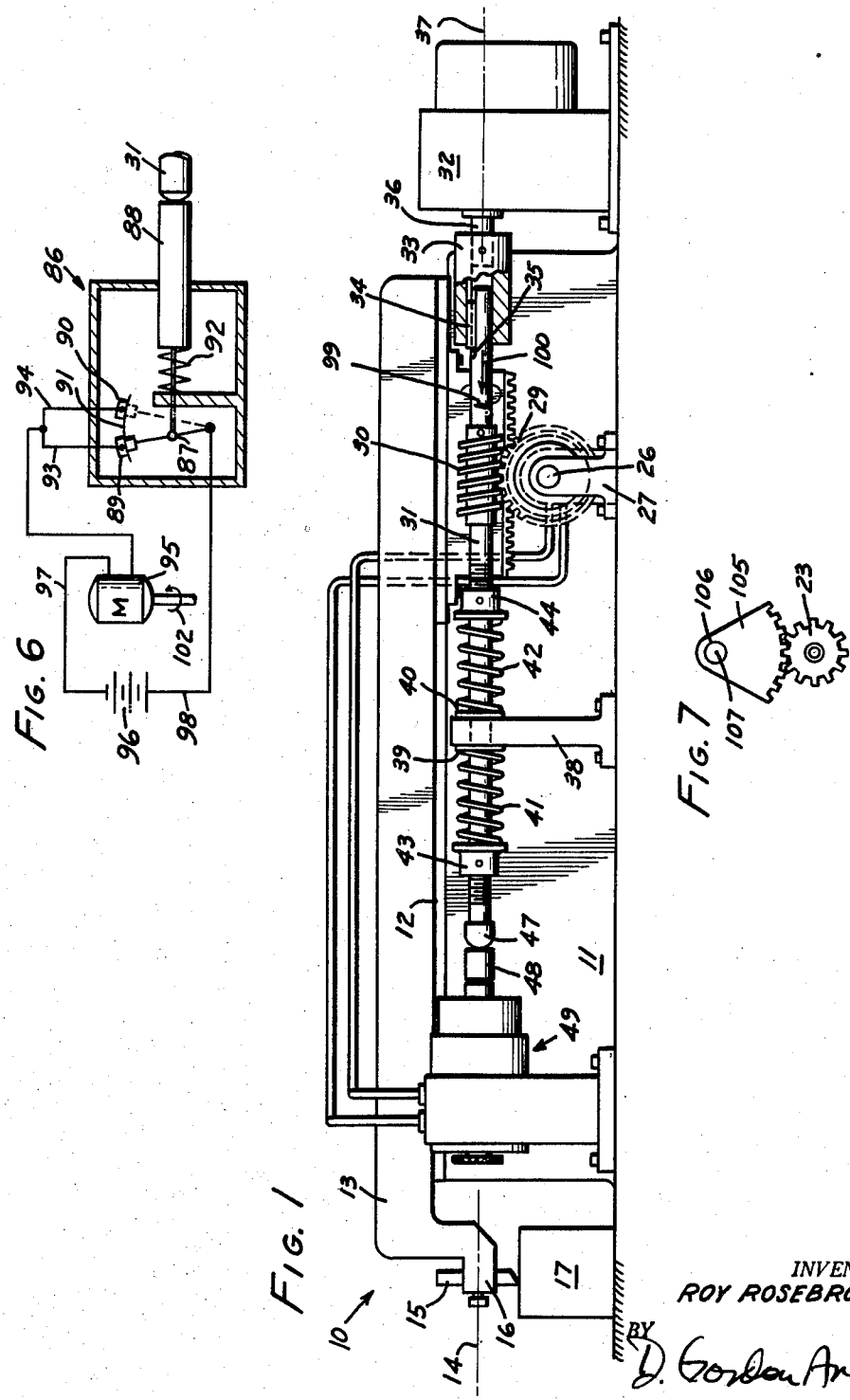
INVENTOR.
ROY ROSEBROOK
BY
D. Gordon Angus
ATTORNEY.

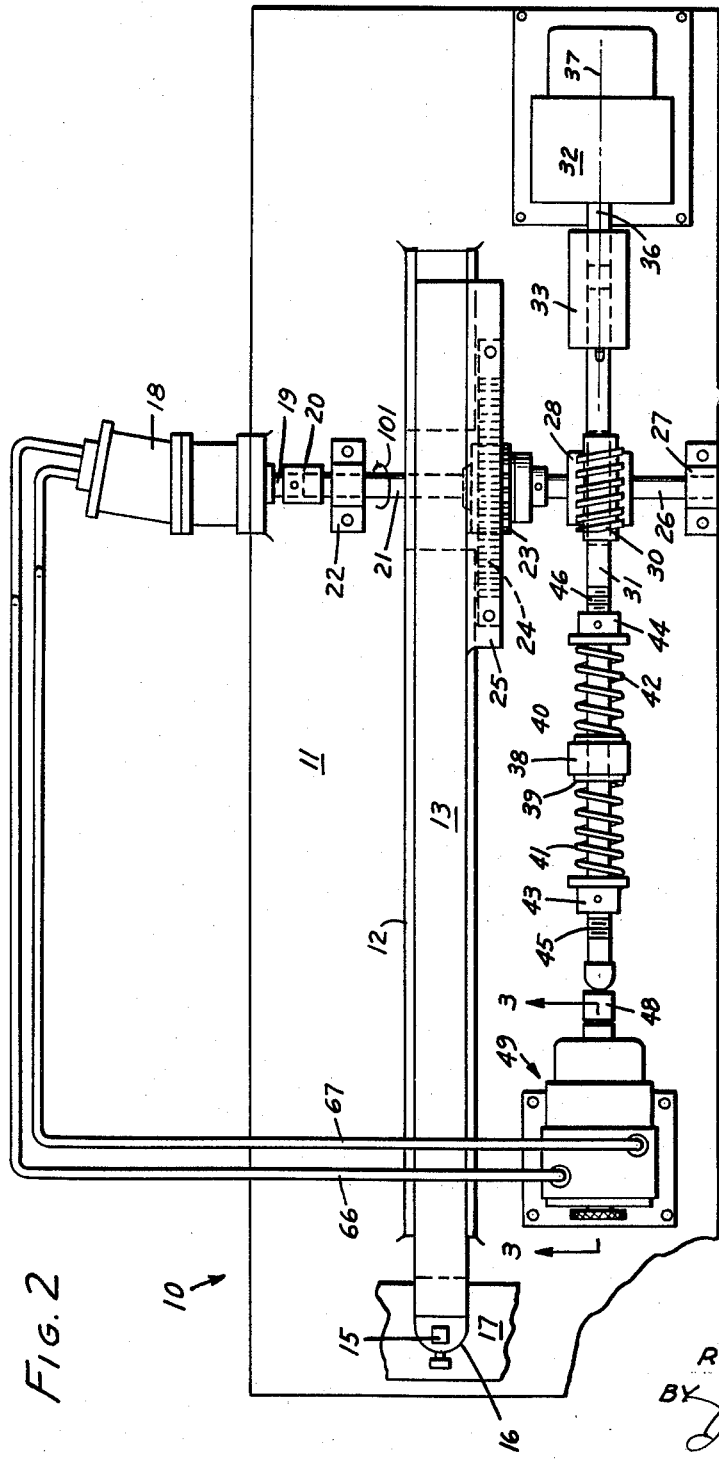

Aug. 4, 1959     R. ROSEBROOK     2,897,788
SERVO CONTROL FOR RACK MECHANISM
Filed Feb. 25, 1957     3 Sheets-Sheet 3
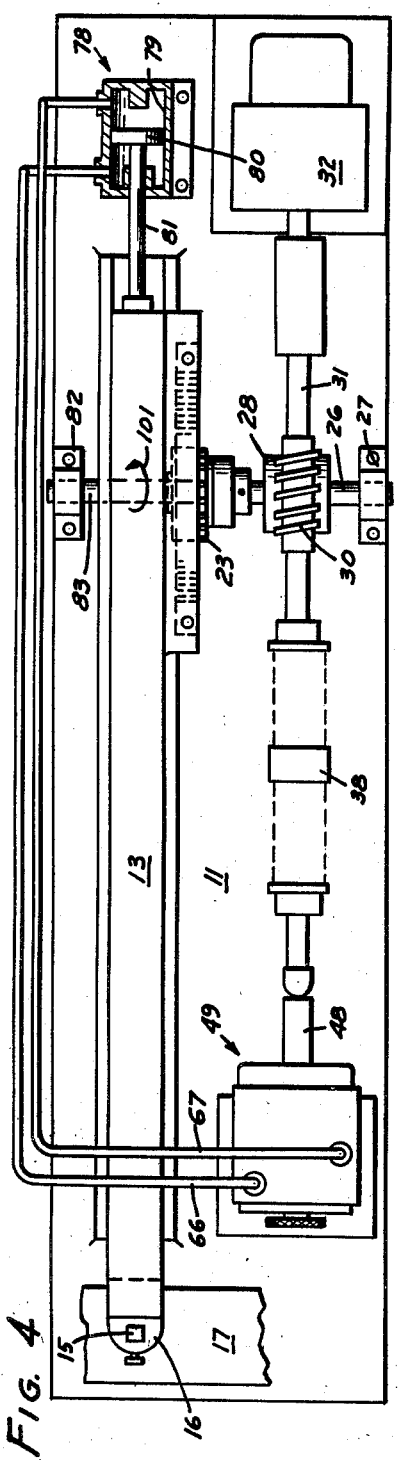
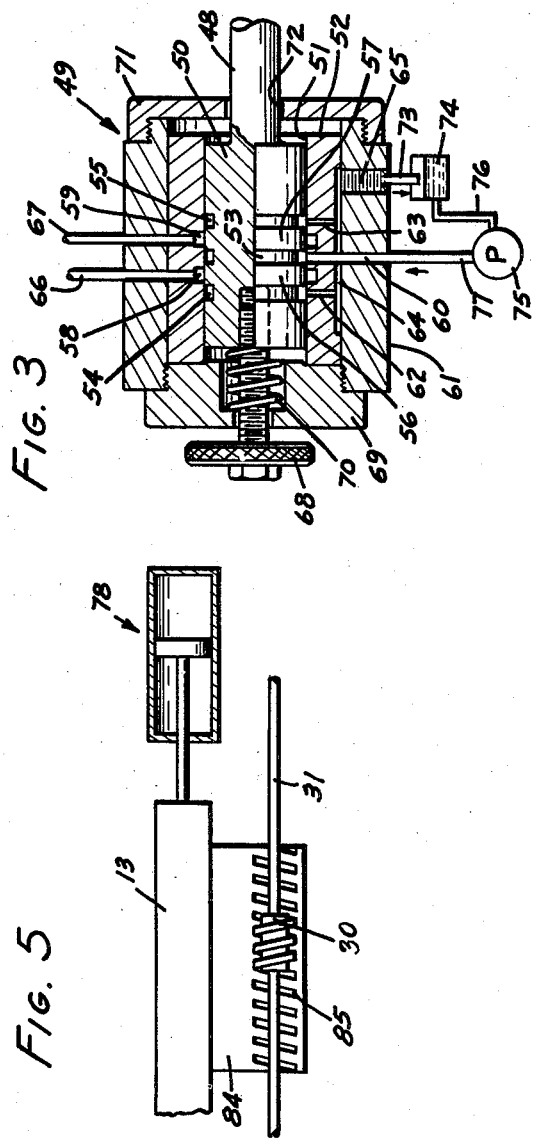
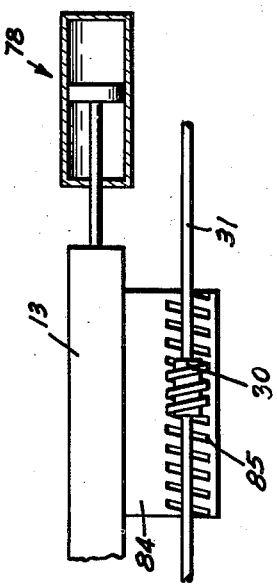
INVENTOR
ROY ROSEBROOK
BY
D. Gordon Angus
ATTORNEY.

United States Patent Office 2,897,788
Patented Aug. 4, 1959

2,897,788

SERVO CONTROL FOR RACK MECHANISM

Roy Rosebrook, Montebello, Calif., assignor to True-Trace Corporation, El Monte, Calif., a corporation of California Application February 25, 1957, Serial No. 642,282

2 Claims. (Cl. 121—41)

This invention relates to the control of machine tools by numerical signals.

An object of this invention is to provide a machine tool control system which enables some member of a machine tool, such as the slide of a shaper, for example, to be moved some desired distance. The command for this movement may conveniently be numerical in nature, such as a signal obtained from a rotating shaft wherein the total angular movement of the shaft is proportional to the desired movement of the machine tool.

This invention is carried out in combination with a machine tool which has a pair of members which are to be relatively positioned in order to machine objects to a desired shape. Motive means are provided for relatively shifting the said members, and the control system of this invention provides a means for energizing these motive means to accomplish the desired tool movement.

This invention resides in signal, control, and feed-back means which direct the application of power to said motive means, and assure a correct obedience to the command signal.

According to this invention a signal shaft is mounted so as to be rotatably and axially movable. This signal shaft bears an advancing thread which is preferably, although not necessarily, a worm. A control means which is preferably a switch of some variety such as a hydraulic selector valve or electric switch is operatively engaged with the signal shaft so as to be actuated thereby. Gear means are engaged to the said advancing thread, and said gear means are responsive to movement of the number of the machine tool which is to be moved, and tend to restore the signal shaft to an axial neutral position in accordance with the response of the motive means.

In the operation of this device a suitable signal for movement of the machine tool consists of rotation of the signal shaft which moves the said shaft axially over the gear means so as to actuate the control means. In turn these control means energize the motive means which, thereupon shift the movable member of the machine tool. As the movable member shifts, the gear means also move and tend to restore the signal shaft to a datum null position, when the desired machine element movement has taken place.

Accordingly this invention contemplates signal means effective upon a control means such as a hydraulic selector valve to direct energy to a motive means, and a feed back means wherein the movable portion of the machine tool tends to restore the signal means to a null position when its command has been carried out.

The above and other features of this invention will be fully understood from the following detailed description and the accompanying drawings, of which:

Fig. 1 is a side elevation of the presently preferred embodiment of this invention;

Fig. 2 is to top view of Fig. 1;

Fig. 3 is a side view, partly in cross section, taken at line 3—3 of Fig. 2, showing a hydraulic selector valve in full detail;

Fig. 4 is a top view of a modification of the device of Fig. 1, utilizing another type of motive means;

Fig. 5 is a fragmentary top view of an alternate signal and feed-back means which may be used in the system of Fig. 4;

Fig. 6 is a fragmentary cross-section view, partly in schematic notation and partly in elevation, showing another type of control and motive means which may be utilized in the system of Fig. 1; and Fig. 7 shows an adaptation of the system of Fig. 1 to control rotary movement around an axis.

The presently preferred embodiment of this invention is shown in Fig. 1 installed to control a shaper 10. The shaper is exemplary of machine tools wherein two members are slidable relatively to each other for positioning a cutting tool relative to a work piece. For example, the shaper has a bed member 11, with ways 12 which receive a slide member 13. The slide is reciprocable along an axis 14.

A cutting tool 15, is held to the slide member by a tool holder 16. A workpiece 17 may be mounted to the bed member if desired. It will be observed that the machine tool shown exemplifies relative sliding along a single axis, and that the system described herein might be duplicated for each of a plurality of axes, whereby a number of these systems may control an equal number of axes for such means for example as duplicating contours in two or three dimensions or perhaps even more than three axes as in the case of twist mills, for example.

A motive means such as a rotary hydraulic motor 18 (see Fig. 2) is mounted to the bed, and has an output shaft 19 which is joined by coupling 20 to a power shaft 21. The power shaft is journaled in a pillow block 22 mounted to the bed. A power gear 23 is keyed to the power shaft 21 so as to apply power to the slide member 13 through a gear means such as a rack 24 provided on a flange 25 that is attached to the slide. It will be seen that the motive means, that is, the hydraulic motor 18, is interposed between the bed member and the slide member so as to reciprocate the slide member relative to the bed member. The rack 24, while engaging and driving the power gear 23, also drives a feed-back shaft 26. This feed-back shaft is keyed to the aforesaid power gear so that the feed-back shaft 26 is turned when the power gear is turned. This feed back shaft is conveniently journaled in a pillow block 27 which is mounted to the bed member.

A feed back gear 28, having an advancing thread 29, is keyed to the feed-back shaft so as to be turned therewith. This feed-back gear engages another advancing thread 30, which thread 30 is concentric around and preferably integral with a signal shaft 31. The feed-back gear and the two advancing threads 29, 30, may conveniently be formed as components of a worm and a gear having a matching thread, the thread 30 being a worm. It will be recognized that other advancing threads, such as spiral gearings, might also be used.

A signal source 32 is connected to a signal shaft 31 by means of a coupling 33. The signal source forms no part of this invention, and will therefor not be described herein in greater detail. It might, for example, be a stepping switch. It is the purpose of this signal source to provide a numerical signal proportional to the desired movement of the slide member.

The coupling 33 is a keyed coupling wherein a key 34 on the coupling slides in a slot 35 in the signal shaft, whereby the signal shaft is constrained to rotate with the output shaft 36 of the signal source, and can slide axially along the axis 37 of the signal shaft. The signal shaft is rotatably and slidably journaled in a pillow block 38 which is mounted to the bed member of the machine tool.

It will therefore be seen that the signal shaft is axially and rotatably mounted.

The pillow block 38 has a pair of opposed abutment faces 39, 40 against which a pair of springs 41, 42 bear. These springs are compressed by a pair of collars 43, 44, respectively. The force exerted by each of these springs can be adjusted by turning the collars along threads 45, 46 respectively so as to tend to maintain the signal shaft at a given null position.

The signal shaft has at its lefthand end, as shown in Fig. 1, an extending finger 47 which abuts against a stylus point 48 of a control means such as a hydraulic selector valve 49. In operation this control means is capable of applying fluid under pressure to opposite sides of the hydraulic motor 18 to cause it to run in one direction or the other so as to shift the slide member as appropriate, or to remain at a null position at which no power is supplied to the motor.

The details of construction of a suitable hydraulic selector valve 49 are shown in Fig. 3, wherein the stylus point 48 is shown integral with a valve spool 50. This valve spool fits in a spool passage 51 inside a sleeve 52. The sleeve 52 and the valve spool 50, together with conduits to be described, form a spool valve which acts as a hydraulic selector valve.

The valve spool 50 has a central peripheral pressure groove 53 near its midpoint; and two peripheral exhaust grooves 54, 55, disposed one on each side of the aforesaid pressure groove. Lands 56 and 57 are respectively disposed between grooves 53 and 54, and between grooves 53 and 55. Two peripheral motor supply grooves 58, 59 are formed in the wall of spool passage 51.

A pressure supply port 60 extends through a valve housing 61, and intersects the sleeve 52 opposite the pressure groove 53. A pair of exhaust ports 62, 63 extend through the sleeve to intersect the spool passage 51 adjacent the exhaust grooves 54, 55 respectively. These exhaust ports meet at a manifold 64 which connects to an exhaust connection 65 through the valve housing. Conduits 66 and 67 respectively connect to motor supply grooves 58 and 59.

A thumb screw 68 is threaded into the lefthand end of the valve spool, passing through a cap 69. This cap holds a coil spring 70 in compression between the cap and the spool so as to tend to move the spool to the right as shown in the figures. This cap 69 may conveniently be threadably attached to the valve housing 61.

A second cap 71 is threaded onto the other end of the valve housing, the stylus tip 48 passing through a passage 72 through the cap 71.

A hydraulic system provides hydraulic fluid under pressure to this valve. Fluid is initially received from the exhaust connection 65 into a conduit 73. Conduit 73 discharges into a reservoir 74 from which fluid is withdrawn by a pump 75 through a conduit 76. The pump drives pressurized hydraulic fluid through conduit 77 into the pressure supply port 60.

Fig. 4 illustrates an alternate motive means for the machine tool of Fig. 1, wherein another type of hydraulic motor, a hydraulic piston and cylinder assembly 78 is substituted for the rotary hydraulic motor 18. Like parts as provided in Fig. 1 are designated by like numbers in Fig. 4. It will be observed that conduits 66 and 67, instead of being connected to a rotary hydraulic motor, are connected to the cylinder 79 on opposite sides of a piston 80. A piston rod 81 is connected to the slide member 13 for shifting the same in accordance with the supply of pressurized fluid to the cylinder 79. An additional pillow block 82 is provided for journaling the shaft 83. Shaft 83 acts to support gear 23, which may be the same gear as shown in Fig. 1, except that in this case the gear 23 is not provided for exerting power on the slide, but only to perform its function in the feedback mechanism by indicating the actual movement of the slide member.

In Fig. 5 there is shown still another modification of the structure wherein like parts again bear like numerals. In this embodiment, the hydraulic cylinder assembly 78 is again operatively connected to the slide member 13, and the signal shaft 31 is driven as before by the signal source. The signal shaft carries a worm with an advancing thread 30 thereon.

In this embodiment, instead of providing a feed-back gear such as the gear 28 of Figs. 1 and 4 which is driven through a feed-back shaft from still another gear, this slide is provided with a flange 84 which has gear means cut with an advancing thread 85 cut therein, so that the worm on the signal shaft and the aforesaid advancing thread 85 are directly meshed.

Fig. 6 illustrates still another means of motive power and control which is suitable for the device of Fig. 1. Inasmuch as this invention primarily relates to means for controlling the movement of a machine tool member in either of two directions, any two-position controlled valve means, whether electrical or hydraulic or otherwise, would suffice to power this device.

In Fig. 6 there is shown an electrical switch 86 having a pivoted contactor 87 linked to a stylus 88, whereby axial movement of the stylus moves the contactor to one or the other of the two contacts 89, 90. There is also a neutral area 91 between the two contacts where the contactor does not complete a circuit through the switch. A coil spring 92 forces the stylus 88 to the right against the signal shaft 31. A pair of leads 93, 94 are respectively connected to contacts 89 and 90 and are connected to separate terminals of a bi-directional electric motor, such as two individual terminals of two opposite windings. The other connection of the motor, which may be a common ground for both windings, is applied to one side of a battery 96 or other current source by a lead 97, while a lead 98 connects the other side of the aforesaid current source to the pivoted contactor 87. The electrical motor 95 may be directly substituted, in all of its mechanical connections, for the hydraulic motor 18 shown in Fig. 1.

Fig. 7 shows a sector gear 105 which is keyed to a shaft 106 engaged to the power gear 23 of Fig. 1. Shaft 106 has an axis 107 perpendicular to the plane of Fig. 7, and the effect of gear 23 is to adjust the angular position of shaft 106. By this means, this invention can control angular positioning of machine tool members or workpieces, as well as merely longitudinal movements.

The operation of the above device will now be described. Assume that the device of Fig. 1 is initially set up at some datum position, and it is desired to move the slide member by some predetermined distance in a given direction. The signal source 32 would then be turned, such as by actuating a stepping switch, by a total number of angular degrees. The slide is to move a total distance which is directly proportional to the total angular movement of the signal shaft. In Fig. 1, arrow 99 defines a clockwise rotation looking to the left along the signal shaft. With the slide member initially still and the feedback gear still with it, such a turning of the signal shaft caused by the signal source will cause the worm to move the signal shaft to the left as shown by arrow 100 in Fig. 1. This is because the advancing thread of the worm moves the worm along the advancing thread on the feedback gear. The signal shaft moves the stylus point 48 to the left in Fig. 1. This compresses coil spring 42 between abutment face 40 and the collar 44. With reference to Fig 3, it will be seen that movement of the stylus tip to the left will cause the central peripheral pressure groove 53 on the spool to move into registration with the motor supply groove 58, and thereby supply pressure through conduit 66 to one side of the hydraulic motor 18. This will actuate the motor for the purpose of moving the slide member.

In order for the motor to run, the spool valve also provides exhaust connections from the motor wherein the motor exhausts into conduit 67. This exhaust passes into motor supply groove 59, and thence into peripheral exhaust groove 55 on the spool. From groove 55 the exhaust fluid passes into exhaust groove 63, manifold 64, and through exhaust connection 65 to reservoir 74 via conduit 73.

This operation of the hydraulic motor will turn the motor clockwise in the direction shown by arrow 101 in Fig. 2 (looking upward along the power shaft 21). This causes the power gear 23 to move the slide member 13 to the right in Fig. 1.

The engagement of the gear means 23 to the rack 24 also turns the feed-back shaft 26 so as to move the feed-back gear 28 in the same sense as arrow 101. Inasmuch as the worm and the feed-back gears are engaged, this rotation of the feed-back shaft moves the signal shaft to the right in Fig. 1 in the opposite direction from its initial movement which was occasioned by the signal source. Sufficient movement of the slide member and the feedback shaft in this manner will cause the feed-back shaft to move to the right far enough that the valve shown in Fig. 3 will assume its neutral position as illustrated. There will thereupon be no further movement of the slide member until an additional signal is given from the signal source.

In the event that movement of the slide member in the other direction is desired, the signal source would turn the signal shaft in the opposite sense from that of arrow 99 thereby moving the signal shaft to the right. In this case the coil spring 70 in the valve would have caused the stylus 48 to move after the retreating shaft. This will cause the reverse connections in the spool valve from those above described. In this event, the central peripheral pressure groove 53 on the spool registers with the motor supply groove 59, thereby providing fluid under pressure through conduit 67 to the other side of the hydraulic motor.

Exhaust fluid returns through conduit 66 to motor supply groove 58, and thence the exhaust fluid passes through exhaust groove 54 into exhaust 62, manifold 64, exhaust 65 and then through conduit 73 to the reservoir 74. In this case the movement of the power shaft will be in the opposite sense from arrow 101 tending to move the slide member to the left as shown in Fig. 1. This causes the feed-back shaft and the feed-back gear also to turn in the opposite sense so as to move the signal shaft to the left so as to press against the stylus 48 to return it to the neutral position as shown in Fig. 3 at which time there will be no further movement of the slide member until a further signal is received from the signal source.

It will be seen from the foregoing description that the control exerted by this system is a means for initially shifting the signal shaft so as to actuate control means. The control means actuate the motive power for shifting the slide. Feedback means responsive to the movement of the slide restore the signal shaft to a null or neutral position when the signal command has been carried out. It will be seen that the motive means may operate as fast or slow as desired, and that there is no need for indexing or carefully controlling their position, inasmuch as the ultimate controlling element is a feed-back means responsive to the desired result.

The operation of the embodiment of Fig. 4 is substantially the same, as above, the sole difference being that instead of a rotary hydraulic motor which applies power for shifting the slide to a rotary power shaft, the embodiment of Fig. 4 uses a hydraulic piston assembly wherein the same means of providing pressurized fluid through one or the other of conduits 66 or 67 will move the device appropriately.

In Fig. 4, when hydraulic fluid under pressure is supplied to conduit 66 as a result of movement of signal shaft to the left, the piston is moved to the right so that the piston and therefore the slide are shifted to the right, turning the shaft in the sense of the arrow 101 shown in Fig. 4. This also moves the feed-back gear so as to restore the signal shaft to its null position after the command from signal source has been carried out.

Providing fluid under pressure to conduit 67 as result of moving of signal shaft to the right causes the slide member to move to the left. This moves the signal shaft to the left by rotation of the feed back shaft. It will therefore be appreciated that the operation of the embodiments of Figs. 1, 2 and 4 are similar in all details except that in one case a reciprocatory motive means is provided instead of a rotary means.

The operation of the device of Fig. 5 is substantially the same as that of Fig. 4 instead that rotation of the signal shaft 31 causes the worm 30 simply to advance along the advancing thread 85 on the flange 84. When the motive means has shifted the slide member then the flange on the slide restores the signal shaft to a null position in the same manner as shown in connection with the devices of Figs. 1, 2 and 4. The embodiment of Fig. 5 merely illustrates that the feed-back shaft can be dispensed with by placing an advancing thread directly on the slide member and engaging the signal shaft therewith. This supplies the feedback information directly, instead of through a gear train.

Fig. 6 illustrates the fact that the spool valve utilized as control means in Figs. 1–4 is actually a double-throw switch with a null position between two operative positions. A hydraulic valve is ordinarily preferred over an electrical switch, inasmuch as it can be delicately controlled by minute adjustment of the degree of registration between the various operating grooves while generally an electric switch causes merely an off-on condition unless a complicated control system is also provided. At any rate, in the event of the stylus 88 in Fig. 6 is moved to the left by rotation of the signal shaft, then the pivoted contact 87 touches contact 89, actuating the motor so as to move the output shaft of the motor in the direction of arrow 102 in Fig. 6 thereby moving the slide to the right in the same fashion as was done with the device of Fig. 1. In the event that the signal shaft is moved to the right, then the coil spring 92 forces the stylus to follow the signal shaft thereby moving the pivoted contactor on to the contact 90 reversing the direction of the motor and also reversing the movement of the slide member. It will be observed that there is a null position at a neutral area 91, where no energy is applied to the motor. This represents the null position attained by the switch when the most recent signal from the signal source has been obeyed.

Fig. 7 illustrates that this invention can control not only the axial shifting of a member but also radial turning of a member around its axis. This radial turning may be desirable for instance in such devices as a twist mill where machining is done with reference to more than three axes. In this case when a motor such as motor 18 in Fig. 1 is operated by the spool valve in response to a signal, then the power gear turns a sector gear 105 keyed to the shaft 106 so as to change its angle. The signal and feed-back considerations and operations of this device are the same as those described in the embodiments of Figs. 1, 2 and 6.

With further respect to the signal source 32, it will be appreciated that it may be a device such as a stepping switch, if desired, or perhaps even a universal-type joint wherein the output represents the resultant rotational movement of two counter-rotating elements. It is possible for the signal shaft to be turned manually, with the tool movement correlated to the dial by appropriate calibration.

From the above, it will be understood that the signal to be obeyed is simply the total angular rotation of the signal shaft, which is a numerical quantity. The ultimate movement of the movable part whether in angular motion or rectilinear motion is numerically proportional to the movement imparted to the signal shaft, by the signal source, whatever that source may be.

The above-described invention provides a convenient means for adjusting the relative position of members of a machine tool in accordance with a numerical signal. Only a simple turning of the signal shaft is required to set the entire mechanism into operation, and to provide feed-back control over the resultant actuation. It will be appreciated that the only force needed to be developed by the signal source is that which is necessary to overcome thread friction at the advancing threads, and to oppose whatever forces are exerted by the control means. These forces need not be, and in fact they are not, particularly large and therefor a delicate movement resulting from a force of comparatively small magnitude is capable of controlling the motion of a heavy component of a machine tool to a high degree of precision.

It will be further appreciated that the type and nature of the motive power is not of particular concern in this control system, inasmuch as the position of the moveable element is checked by means of the feed-back loop. The accuracy of movement has nothing whatever to do with the accuracy of operation of the particular motive means inasmuch as the motive means will be controlled by the valve or switch until the signal shaft is restored to a null position. Therefore a high degree of precision can be obtained even with relatively powerful motive means such as fluid motors or piston and cylinder assemblies.

This device is also useful in connection with machines working on a plurality of axes, both translational and rotational. It will be understood that this invention is applicable not only to interconnect a slide operating on a bed but on one slide operating atop another slide, the term "relatively slidable" as applied to the movement of one machine member relative to another not referring particularly to absolute movement of either one or both elements but simply of the relative positioning of the machine tool members whereby a cutting tool or other metal treating device is shifted relative to the workpiece in which a desired shape is being developed. Also, the term "relatively moveable" includes not only the above, but also angular reorientation around an axis.

This device is especially suited for operation with signal sources operating from coded pulses, such as pulses carried by magnetic tape, wherein a given pulse may operate a stepping switch or other device to rotate the signal shaft by some desired unit amount. This unit value corresponding to unit rotation may, of course, be equivalent to any desired movement of the slidable member of a machine tool, this movement being determined by the pitch of the various threads and also by the fineness or coarseness of the various meshing gears in the feed-back loop, and their diameters and tooth counts, all of which can be varied as desired.

This invention is not to be limited by the embodiments shown in the drawings and described in the description, which are given by way of example, and not of limitation, but only in accordance with the scope of the appended claims.

I claim:

1. In combination, a pair of members of a machine tool, one of said members being movable relative to the other member, and means for relatively moving said members comprising: a hydraulic motor interconnected between said members for exerting force to cause the relative movement between them; a spool valve for controlling application of power to the hydraulic motor, said spool valve comprising a sleeve mounted to a first of said members, said sleeve having a cylindrical spool passage therein, said passage having a central axis and being defined by an interior wall in the sleeve, a pair of motor supply grooves in said wall which are axially spaced from each other, and which are in fluid communication with opposite sides of the hydraulic motor for supplying to and discharging from said motor hydraulic fluid for powering the same, a cylindrical spool in said passage, said spool having an axis which is coincident with the passage axis and which is axially slidable in full peripheral contact with the said wall, a pair of peripheral exhaust grooves in said spool, a peripheral pressure groove in said spool between said exhaust grooves, said spool grooves being spaced apart from each other, a pressure port through said sleeve in fluid communication with said pressure groove, a pair of exhaust ports in said sleeve in fluid communication with the exhaust grooves, the spool valve having a null control position wherein the spool is centered in the passage with the pressure groove equally spaced relative to the motor supply grooves, and a pair of actuating control positions, wherein the spool is axially displaced along the axis with the pressure groove in fluid communication with only one of the motor supply grooves, and with one of the exhaust grooves fluidly interconnecting the other of said motor supply grooves to an exhaust port, a different actuating control position resulting from shifting the spool in each axial direction; means for supplying hydraulic fluid under pressure to said pressure port; a signal shaft having an axis coincident with the axis of the spool, said signal shaft bearing against the spool for the purpose of shifting the spool in the sleeve; bias means forcing the spool against the signal shaft; said signal shaft being mounted to the same first member for rotary and axial movement relative thereto; a worm on, integral with, and concentric with said signal shaft; a worm gear mounted to said first member and engaged to said worm; a rack on the second one of said members; a gear engaged to said rack and driving said worm gear; and signal means for rotating said signal shaft, whereby rotation of said signal shaft by the signal means axially shifts the signal shaft to move the spool so that the valve assumes one of its operative control positions, thereby passing hydraulic fluid under pressure to the motor and relatively moving said members, said rack driving the gear, worm gear and thereby shifting the signal shaft so as to tend to restore the valve to its null control position.

2. Combination according to claim 1 in which the hydraulic member is a rotary hydraulic motor.

References Cited in the file of this patent

UNITED STATES PATENTS

| | | |
|---|---|---|
| 419,874 | Parkin | Jan. 21, 1890 |
| 1,513,530 | Bliss | Oct. 28, 1924 |
| 2,137,462 | Romaine | Nov. 22, 1938 |
| 2,213,271 | Davis | Sept. 3, 1940 |
| 2,601,157 | Lan | June 17, 1952 |
| 2,748,881 | Holley | June 5, 1956 |

FOREIGN PATENTS

| | | |
|---|---|---|
| 666,551 | Great Britain | Feb. 12, 1952 |